(12) United States Patent
Lee

(10) Patent No.: US 8,719,435 B2
(45) Date of Patent: May 6, 2014

(54) DEVICES AND METHODS FOR SCHEDULING TRANSMISSION TIME OF MEDIA DATA

(75) Inventor: Yiubun Lee, Kowloon (CN)

(73) Assignee: The Chinese University of Hong Kong, Hong Kong (CN)

( * ) Notice: Subject to any disclaimer, the term of this patent is extended or adjusted under 35 U.S.C. 154(b) by 702 days.

(21) Appl. No.: 12/859,578

(22) Filed: Aug. 19, 2010

(65) Prior Publication Data

US 2011/0066742 A1 Mar. 17, 2011

Related U.S. Application Data

(60) Provisional application No. 61/235,987, filed on Aug. 21, 2009.

(51) Int. Cl.
*G06F 15/16* (2006.01)
*H04L 12/56* (2006.01)
*H04N 21/20* (2011.01)

(52) U.S. Cl.
CPC .......... *H04L 47/00* (2013.01); *H04N 21/20* (2013.01)
USPC .......................................................... 709/230

(58) Field of Classification Search
CPC ................................ H04L 47/00; H04N 21/20
USPC .......................................................... 709/230
See application file for complete search history.

(56) References Cited

U.S. PATENT DOCUMENTS

| | | | | |
|---|---|---|---|---|
| 5,729,540 A | * | 3/1998 | Wegrzyn | 370/336 |
| 5,956,321 A | * | 9/1999 | Yao et al. | 370/230 |
| 6,438,630 B1 | * | 8/2002 | DeMoney | 710/56 |
| 8,014,393 B1 | * | 9/2011 | Faheem et al. | 370/390 |
| 8,578,272 B2 | * | 11/2013 | Pantos et al. | 715/716 |
| 2002/0031086 A1 | * | 3/2002 | Welin | 370/229 |
| 2002/0083185 A1 | * | 6/2002 | Ruttenberg et al. | 709/232 |
| 2002/0150115 A1 | * | 10/2002 | Onvural et al. | 370/411 |

(Continued)

FOREIGN PATENT DOCUMENTS

| CN | 1812575 A | 8/2006 |
|---|---|---|
| WO | WO 02/01344 A2 | 1/2002 |

OTHER PUBLICATIONS

International Search Report for International Application No. PCT/CN2010/076129, mailed Dec. 2, 2010, 3 pages.

(Continued)

*Primary Examiner* — Imad Hussain
(74) *Attorney, Agent, or Firm* — Seed IP Law Group PLLC

(57) ABSTRACT

Disclosed are a method and device for scheduling transmission time of media data. The media data comprises a plurality of media data units. In one embodiment, the device comprises: a first determination unit configured to determine a latest time for transmitting each media data unit; a second determination unit configured to determine an earliest time for transmitting each media data unit; and a scheduling unit configured to schedule a transmission time for each media data unit by rule of: if the determined latest time for a media data unit is not less than the determined earliest time for said media data unit, the scheduling unit selects a maximal one from the determined earliest time and a predetermined transmission time for said media data unit as the transmission time, otherwise, the scheduling unit schedules the transmission time at the determined earliest time.

22 Claims, 7 Drawing Sheets

(56) References Cited

U.S. PATENT DOCUMENTS

| | | | |
|---|---|---|---|
| 2003/0037133 A1* | 2/2003 | Owens | 709/223 |
| 2004/0049793 A1* | 3/2004 | Chou | 725/87 |
| 2004/0117577 A1* | 6/2004 | Bloks | 711/167 |
| 2004/0170198 A1* | 9/2004 | Meggers et al. | 370/514 |
| 2006/0036759 A1* | 2/2006 | Shen et al. | 709/234 |
| 2006/0037047 A1* | 2/2006 | DeYonker et al. | 725/58 |
| 2007/0195789 A1* | 8/2007 | Yao | 370/395.21 |
| 2009/0222580 A1* | 9/2009 | Stasi et al. | 709/240 |
| 2009/0328114 A1* | 12/2009 | Van Gassel et al. | 725/87 |
| 2010/0254462 A1* | 10/2010 | Friedrich et al. | 375/240.25 |
| 2011/0106949 A1* | 5/2011 | Patel et al. | 709/226 |

OTHER PUBLICATIONS

Written Opinion for International Application No. PCT/CN2010/076129, mailed Dec. 2, 2010, 3 pages.

* cited by examiner

DEVICES AND METHODS FOR SCHEDULING TRANSMISSION TIME OF MEDIA DATA

RELATED APPLICATIONS

This application claims the benefit of U.S. Provisional Patent Application No. 61/235,987, titled "systems and methods for scheduling transmission time of media data", filed Aug. 21, 2009. The contents of U.S. Application No. 61/235,987 is incorporated by reference herein in its entirety as part of this application.

TECHNICAL FIELD

The application relates to devices and methods for scheduling transmission time of media data.

BACKGROUND

In media streaming applications, a data stream is composed of a sequence of data segments to be delivered to a receiver at a prescribed data rate (or data rate profile in case of variable-bit-rate encoded media data) so that the receiver may begin playback of the received data segments while concurrently receiving subsequent data segments. As long as data segments may be delivered to the receiver before their prescribed playback time, the receiver may sustain continuous media playback without any interruptions.

The delivery of media data is carried out through a transport protocol. There are transport protocols that are specifically designed for streaming media such as RTSP/RTP. However, an increasing number of media contents are delivered using standard HTTP protocols nowadays, which in turn utilize TCP to transport the data from the server to the client. This creates a new problem as neither HTTP nor TCP were originally designed for media streaming applications.

Specifically, TCP has a built-in congestion-control mechanism which performs two tasks. First, it incrementally increases the transmission rate to probe for the bandwidth available in the path from the sender to the receiver. Second, it detects the network congestion by monitoring packet losses so that the transmission rate, controlled by the congestion window, may be reduced to alleviate the network congestion. In a typical TCP flow, the transmission rate will be increased incrementally until it exceeds the network's bandwidth limit, which then results in packet losses, and thus triggering the congestion control mechanism to cut down the transmission rate.

However, this congestion control mechanism will generate unnecessary packet losses in cases where (a) the media stream has known bandwidth requirements; and (b) the network has sufficient bandwidth to satisfy the media stream's bandwidth requirements. As an illustration, assume a media stream is encoded at a data rate of 200 kbps and the network has 500 kbps bandwidth available, which is more than sufficient for the media stream, if the media stream is delivered using a server such as a web server, the web server will attempt to send the media stream data to the receiver using the HTTP protocol, which in turn utilizes TCP for the actual data delivery.

At the beginning of the session, the server will only send at a low data rate, but the transmission rate will incrementally increase accordingly as TCP grows its congestion window. Eventually the transmission rate will exceed the network's 500 kbps bandwidth limit and result in packet losses. Unaware to TCP the congestion is in fact self-induced. This triggers TCP's congestion control mechanism into cutting down the transmission rate dramatically to cope with the network congestion. It will take some time before the transmission rate may ramp up again, and thus the overall throughput achieved will be substantially lower than the network bandwidth (500 kbps) and in some cases, even lower than the media stream data rate (200 kbps). In the latter case, it will result in playback interruptions.

FIG. 1 illustrates this problem by plotting the TCP throughput versus time for streaming a 250 kbps media using HTTP over a 3G mobile network. Note that the transmission rate consistently increases to around 500 kbps as TCP will continue to probe for additional bandwidth. The deep valleys in FIG. 2 are the self-induced congestions which occurred repeatedly over the entire streaming duration. In this experiment, although the network may sustain up to 500 kbps, which is double the media stream's data rate at 250 kbps, the overall average throughput achieved was in fact less than 250 kbps. So, the playback will be paused repeatedly over the entire streaming duration, leading to very poor quality of service.

SUMMARY

According to one aspect of the application, there is disclosed a device for scheduling transmission time of media data comprising a plurality of media data units. The device comprises:

a first determination unit configured to determine a latest time for transmitting each of the media data units;

a second determination unit configured to determine an earliest time and an absolute earliest time for transmitting each of the media data units; and a scheduling unit configured to schedule a transmission time for each of the media data units, wherein, if the determined latest time for one of the media data units is not less than the determined earliest time for said media data unit, the scheduling unit selects a larger one from the determined earliest time and a time at which the one of the media data units was originally submitted to the device for transmission, as the transmission time for said one of the media data units; otherwise, the scheduling unit schedules the transmission time at the determined absolute earliest time.

According to another aspect of the application, there is disclosed a device for scheduling a reception time of media data comprising a plurality of media data units. The device comprises:

a retrieving unit for retrieving a maximum transmission rate for the media data units;

a first determining unit for determining an earliest time for receiving each of the media data units based on the maximum transmission rate and a short-term data throughput for the media data units over a past time interval; and a second determining unit for determining a latest time for receiving each of the media data units based on the determined short-term data throughput; and a scheduling unit for optimizing the reception time for each of the media data units within a range from the determined earliest time to the determined latest time.

According to another aspect of the application, there is disclosed a device for scheduling reception time of media data comprising:

an earliest time determining unit configured to calculate a short-term data throughput for the media data over a past transmission period, and determine an earliest time for receiving an media data unit of the media data based on the calculated short-term data throughput; and a scheduling unit configured to schedule a time for receiving each media data unit to be later than the calculated earliest time.

According to another aspect of the application, there is disclosed a method for scheduling transmission time of media data comprises a plurality of media data units comprising:

determining a latest time for transmitting each of the media data units;

determining an earliest time and an absolute earliest time for transmitting each of the media data units; and scheduling a transmission time for each of the media data units, wherein the scheduling further comprises:

if the determined latest time for one of the media data units is not less than the determined earliest time for said media data unit, selecting a larger one from the determined earliest time or a time at which the media data unit was submitted for transmission, as the transmission time for said media data unit, otherwise, scheduling the transmission time at the determined absolute earliest time.

According to another aspect of the application, there is disclosed a method for scheduling a reception time of media data comprising:

receiving a plurality of media data units of the media data;

retrieving a time at which each of the media data units is scheduled to be decoded for playback, and a maximum transmission rate for the media data units;

determining an earliest time for receiving each of the media data units through the maximum transmission rate and a short-term data throughput over a past time interval for the media data units; and determining a latest time for receiving each of the media data units from the determined time; and optimizing the reception time for the each of the media data units within a range from the determined earliest time to the determined latest time.

DETAILED DESCRIPTION

Hereinafter, the exemplified embodiments in the application will be discussed in reference to the accompanying drawings.

In the embodiments to be discussed, a data stream or media data is processed at a scheduler that may be located in a server or a client. In the context of the description, a solution in which the scheduler is located in the server refers to a server-based solution, and a solution in which the scheduler is located in the client refers to a client-based solution. In addition, a network-based solution will also be discussed.

I. Server-Based Solutions

Figure 1:
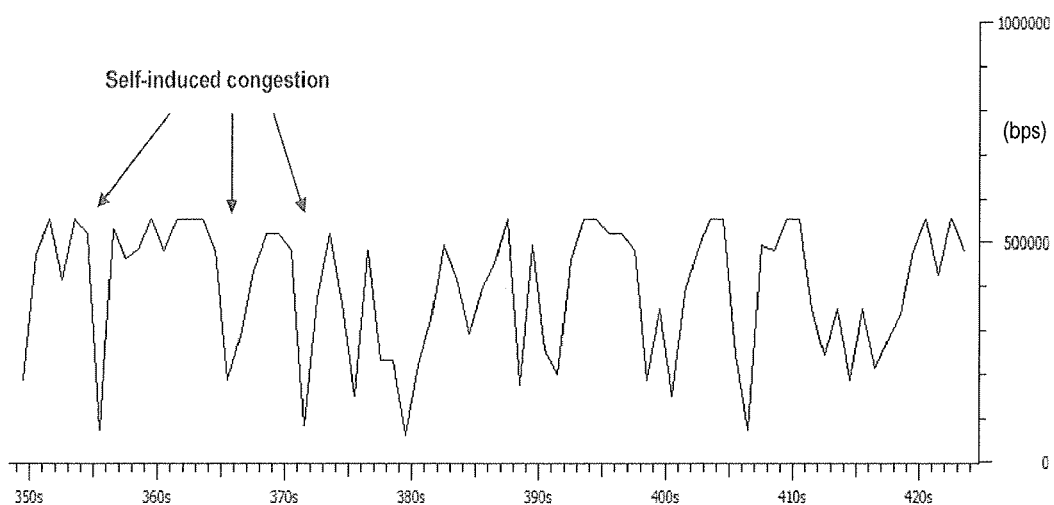
FIG. 1 illustrates a TCP throughput versus time over a 3G mobile network in the prior art.
Figure 2:
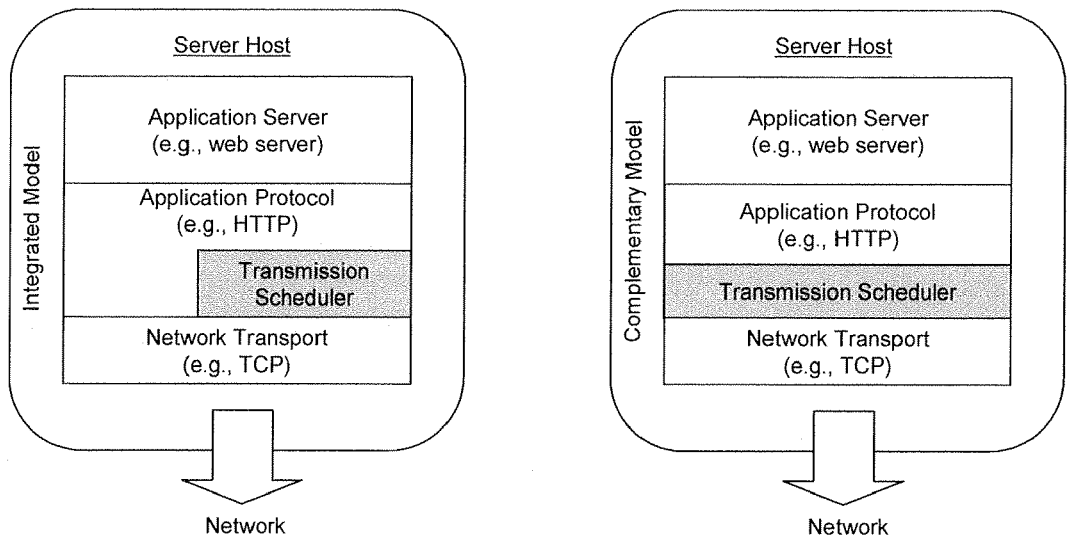
FIG. 2 illustrates two design models for server-based, application-layer solutions.

The server-based solution is designed to be implemented as part of the server delivering the media stream data, and may be implemented either as part of the application server or as a complementary system module working alongside the application server, as is shown in FIG. 2. The key component in the server-based solution is a transmission scheduler interfacing between the server application and the network transport. Its function is to regulate the data flow from the application to the network transport as an indirect way to regulate the transported data's transmission rate.

Figure 3:
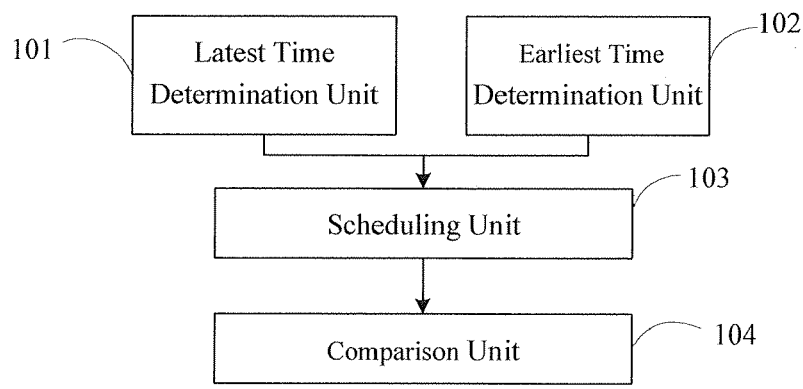
FIG. 3 is a block diagram illustrating a scheduler according to one embodiment of the application.
Figure 4:
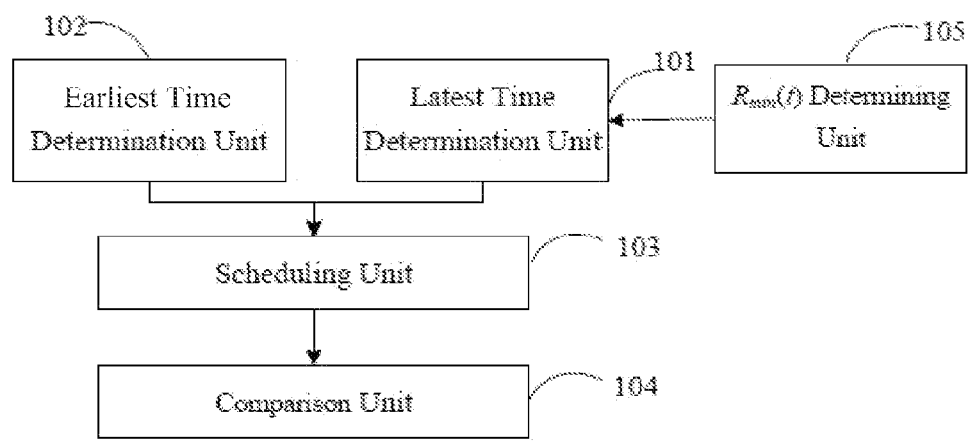
FIG. 4 i is a block diagram illustrating a scheduler according to another embodiment of the application.

FIG. 3 illustrates a scheduler 100 according to one embodiment of the application. The transmission scheduler 100 may operate with two input parameters: (a) the minimum data rate $R_{min}$; and (b) the maximum transmission rate $R_{max}$. Let $t_i$ and $s_i$, i=0, 1, . . . , be the time and the size (in bytes) of the $i^{th}$ media data unit submitted to the transmission scheduler for delivery. Let $u_i$ be the actual time when media data unit i is submitted to the transport protocol for delivery—the scheduled transmission time. The objective of the transmission scheduler is: given $\{t_i, s_i\}$, determine the $\{u_i\}$ such that (a) the long-term average data throughput is not less than $R_{min}$ and (b) the short-term data rate does not exceed $R_{max}$.

As shown in FIG. 3, the transmission scheduler 100 comprises a latest time determination unit 101, an earliest time determination unit 102, a scheduling unit 203 and a comparison unit 104.

As a general rule, media data unit i=0 is always transmitted immediately, i.e., $u_0=t_0$, and the scheduled transmission time for subsequent media data units (i.e., i>0) is then determined from the units 101~104, which is discussed as below.

1.1. Example 1

Constant Rate Media Data

1) The Latest Time Determination Unit 101

In this example, the latest time determination unit 101 operates to determine a latest time $v_i$ for transmitting an $i^{th}$ media data unit of the media data units. In particular, the latest time determination unit 101 first determines the overall average data throughput from:

$$C(t) = \frac{\sum_{\forall i \in \{t > u_i \geq \max\{u_0, (t-T_L)\}\}} s_i}{\min\{T_L, t - u_0\}} \quad (2.1)$$

where $T_L$ is a configurable parameter to tune the long-term averaging window duration and t is the current time. Note that by setting $T_L=\infty$ the averaging window will cover the entire media session and is equivalent to the overall average data throughput. Next the latest time determination unit 101 determines the latest time $v_i$ to transmit $i^{th}$ media data unit from $$v_i = \max\left\{\max\left\{t \left| \frac{(C(t)\min\{T_L, (t-u_0)\} + s_i)}{\min\{T_L, (t-u_0)\}} > R_{min}\right.\right\}, t_i\right\} \quad (2.2)$$

such that the overall data throughput may be maintained to above the minimum rate $R_{min}$.

2) The Earliest Time Determination Unit 102

The earliest time determination unit 102 determines the short-term data throughput over the past $T_S$ seconds, denoted by $C(T_S,t)$, where $T_S$ is a configurable parameter to tune the averaging window duration and t is the current time:

$$C(T_S, t) = \frac{\sum_{\forall i \in \{t > u_i \geq \max\{u_0, (t-T_S)\}\}} s_i}{\min\{T_S, t - u_0\}} \quad (2.3)$$

Similarly, the earliest time determination unit 102 operates to determine the earliest time to transmit $i^{th}$ the media data unit from $$w_i = \max\left\{\min\left\{t \left| \frac{(C(T_S, t)\min\{T_S, t-u_0\} + s_i)}{\min\{T_S, t-u_0\}} \leq \rho R_{max}\right.\right\}, t_i\right\} \quad (2.4)$$

where $\rho \in [R_{min}/R_{max}, 1]$ is a configurable parameter to tune the target short-term data throughput of the media stream. In general, it is not desirable to set the target data throughput to $R_{min}$ as there is no guarantee that the media data unit may be transmitted immediately after submitting to the transport layer. For example, if TCP has triggered congestion control which drastically cuts down the congestion window then it will not be able to transmit newly submitted media data until its congestion window recovers. The additional delay will therefore increase $w_i$ beyond its scheduled time and as a result the data throughput will become lower than expected. Therefore it is desirable to target at a data throughput higher than $R_{min}$ so that sufficient media data may be transmitted ahead of time to absorb such extra delays.

On the other hand, it is also not desirable to set the target data throughput to $R_{max}$ as $R_{max}$ may be chosen to represent the maximum bandwidth capacity of the network. In most networks the maximum bandwidth capacity is not guaranteed and is subject to other factors such as signal quality, competing traffic, etc., and thus may vary from time to time. The purpose of $R_{max}$ is to ensure that the short-term transmission rate will not exceed the network's maximum capacity, which is a hard limit that will cause congestion if exceeded. Therefore by targeting at a data throughput lower than $R_{max}$ but higher than $R_{min}$ the system may transmit media data ahead of time without triggering self-induced network congestion.

3) The Scheduling Unit 103

With the determined latest transmission time $v_i$ and earliest transmission time $w_i$, the scheduling unit 103 is configured to schedule a transmission time for each media data unit. In particular, the scheduling unit 103 is configured to compare the scheduled transmission time for each media data unit with a current time t, and transmit each media data unit immediately if the scheduled transmission time $u_i$ is not larger than the current time t; and wait for a time, which is equal to $(t-u_i)$, and then transmit the $i^{th}$ media data unit if the scheduled transmission time $u_i$ is larger than the current time t. In one embodiment, the scheduling unit 103 sets the scheduled transmission time to be $w_i$ if $v_i \geq w_i$, i.e., $$u_i = \max\{w_i, t_i\}, \text{if } v_i \geq w_i \quad (2.5)$$

Otherwise, $v_i < w_i$ implies that the overall data throughput is already below the minimum rate $R_{min}$ even if the media data unit i is to be transmitted at the earliest transmission time $w_i$. In this case, the scheduling unit 103 shall transmit the media data unit immediately as it is already failing to sustain the minimum rate $R_{min}$. However, depending on the current short-term data rate, this may not be optimal as transmitting at a rate exceeding $R_{max}$ may result in self-induced network congestion, which will further degrade the transport's achievable data throughput significantly.

Therefore in case $v_i < w_i$, the scheduling unit 103 schedules the media data to be transmitted at the earliest time such that the short-term rate maximum $R_{max}$ is not exceeded:

$$u_i = \max\left\{\min\left\{t \left| \frac{(C(T_S, t)\min\{T_S, t-u_0\} + s_i)}{\min\{T_S, t-u_0\}} \leq R_{max}\right.\right\}, t_i\right\}, \quad (2.6)$$

if $v_i < w_i$

4) The Comparison Unit 104

Finally, the comparison unit 104 compares the scheduled transmission time $u_i$ with a current time t. If the scheduled transmission time $u_i$ is not larger than the current time t; the comparison unit 104 transmits the $i^{th}$ media data unit immediately; otherwise, the comparison unit 104 waits for a time equal to $(t-u_i)$ and then transmits the $i^{th}$ media data unit if the scheduled transmission time $u_i$ is larger than the current time t.

1.2. Example 2

VBR Encoded Media Stream

In example 1, the media data rate was assumed to be a constant so that the minimum rate limit $R_{min}$ may be configured to match the media data rate. The transmission scheduler 100 may be extended to support the streaming of Extension to Variable-bit-rate (VBR)-encoded media streams if the bit-rate profile is known.

Let $p_i$ be the prescribed playback time of media data unit i. If the set of $\{p_i\}$ is given a priori, then the scheduler may incorporate it into the scheduling methods described in the example 1. Specifically, the minimum rate limit $R_{min}$ is revised as long-term average data throughput will not be useful for VBR-encoded media stream. The long-term average data throughput is replaced by the short-term variable minimum rate limit $R_{min}(t)$ which is a media-playback-time-dependent function. In this example, the scheduler 100 may further includes a $R_{min}(t)$ determining unit 105 for determining the short-term variable minimum rate limit $R_{min}(t)$ from $$R_{min}(t) = \alpha \frac{\sum_{\forall i \in \{t > p_i \geq \max\{0, (t-T_L)\}\}} s_i}{\min\{T_L, t\}} \quad (2.7)$$

where t is the playback time of the media stream, $s_i$ is the size of media data unit i., and $\alpha$, ($\alpha \geq 1$), is a scaling factor to fine tune the minimum rate limit.

With $R_{min}(t)$ defined, the scheduler 100 proceeds to schedule media data units for transmission as follows. First, media data unit i=0 is always transmitted immediately. Second, the scheduled transmission time for subsequent media data units (i.e., i>0) is determined from the following procedures, which will also be discussed in reference to units 101~104.

The latest time determination unit 101 determines the overall average data throughput C(t) from Equation (2.1). Next it determines the latest time to transmit media data unit i from $$v_i = \max\left\{\max\left\{t \mid \frac{(C(t)\min\{T_L, (t-u_0)\} + s_i)}{\min\{T_L, (t-u_0)\}} > R_{min}(t-u_0)\right\}, t_i\right\} \quad (2.8)$$

such that the short-term data throughput may be maintained above the minimum rate $R_{min}(t)$.

The earliest time determination unit 102 next determines the short-term data throughput $C(T_S, t)$ from Equation (2.3) and then uses it to determine the earliest time $w_i$ to transmit media data unit i from Equation (2.4).

With the determined latest transmission time $v_i$ and earliest transmission time $w_i$, the scheduling unit 103 is configured to schedule a transmission time for each media data unit the transmission scheduler. In particular, the scheduling unit 103 set the scheduled transmission time $u_i$ to $w_i$ if $v_i \geq w_i$, i.e., $$u_i = \max\{w_i, t_i\}, \text{if } v_i \geq w_i \quad (2.9)$$

Otherwise, $v_i < w_i$ implies that the overall data throughput is already below the minimum rate $R_{min}(t)$ even if the media data unit i is to be transmitted at the earliest transmission time $w_i$. In this case the he scheduling unit 103 will schedule the media data to be transmitted at the earliest time such that the short-term rate maximum $R_{max}$ is not exceeded:

$$u_i = \max\left\{\min\left\{t \mid \frac{(C(T_S, t)\min\{T_S, t-u_0\} + s_i)}{\min\{T_S, t-u_0\}} \leq R_{max}\right\}, t_i\right\}, \quad (2.10)$$
$$\text{if } v_i < w_i$$

Finally, the comparison unit 104 will compare $u_i$ against the current time t. If $u_i \leq t$, then the scheduled transmission time had already passed and the scheduler will then immediately submit the media data unit to the network transport for delivery. Otherwise if $u_i \leq t$, then the comparison unit 104 will wait for a time equal to $(t-u_i)$ and then submit the media data unit to the network transport for delivery.

1.3 Example 3

Extension to Media Data Rate Estimation

Figure 5:
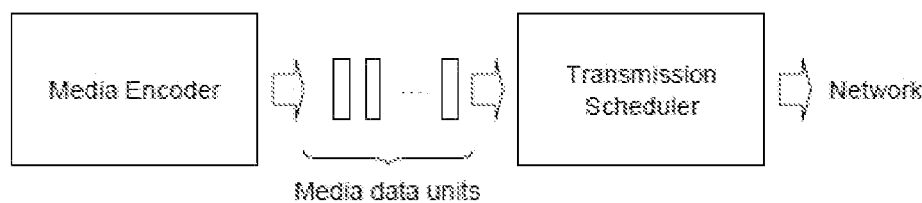
FIG. 5 illustrates a solution for adaptive media data rate estimation.

In some applications such as live streaming, the precise media data rate may not be known a priori. This example tackles this problem by estimating the media data rate from monitoring the data generation process. FIG. 5 depicts data flow in the system. An external media encoder generates encoded media data units of unknown data rates and then transports them (e.g., over network or over a shared storage device) to the server for streaming to clients. Although the encoded data rate is not known, it is nonetheless related to the rate at which media data units are generated. Therefore, by measuring the rate at which media data units are generated, the transmission scheduler may then estimate and adapt $R_{min}(t)$ accordingly.

Figure 6:
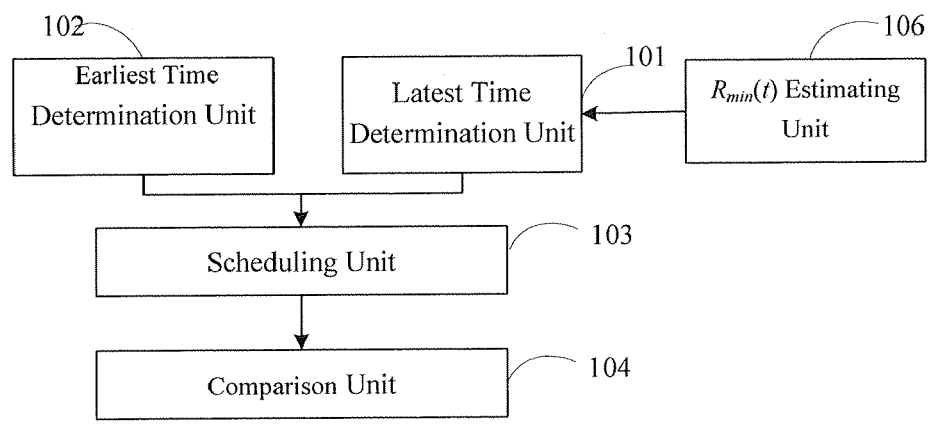
FIG. 6 is a block diagram illustrating a scheduler according to another embodiment of the application.
Figure 7:
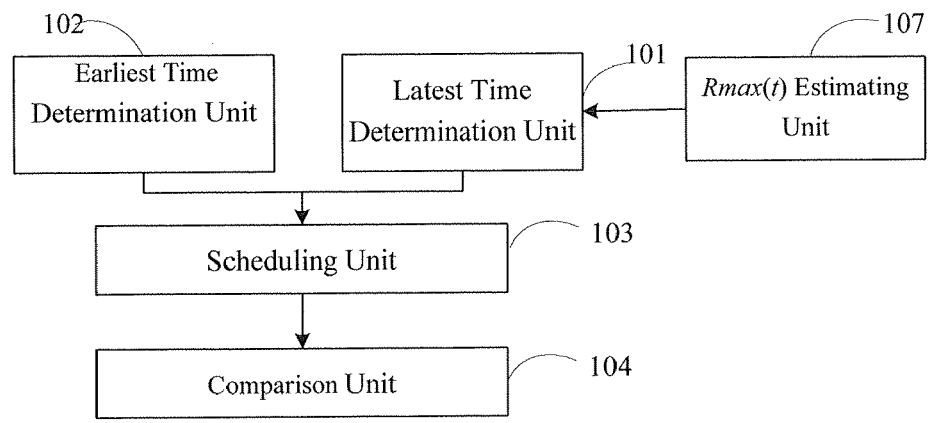
FIG. 7 is a block diagram illustrating a scheduler according to another embodiment of the application.

Specifically, in this example, the scheduler 100 may further include an estimating unit 106 for estimating short-term minimum rate limit $R_{min}(t)$, as shown in FIG. 6. Let $g_i$ be the generation time of media data unit i. The short-term minimum rate limit $R_{min}(t)$ is then estimated by the estimating unit 106 from $$R_{min}(t) = \alpha \frac{\sum_{\forall i \in \{t > (g_i - g_0) \geq \max\{0, (t-T_L)\}\}} s_i}{\min\{T_L, t\}} \quad (2.11)$$

where t is the playback time of the media stream, $s_i$ is the size of media data unit i., $T_L$ is the averaging window duration, and $\alpha$, ($\alpha \geq 1$), is a scaling factor to fine tune the minimum rate limit.

The rest of the scheduling procedures by the units 101~104 is the same as those discussed in reference to Equations (2.8) to (2.10) in example 2.

One potential problem in this model will occur when the media encoder outputs media data units are significantly larger than the transmission data units. For example, the transmissions scheduler may be scheduling data for transmission in units of KBs but the media encoder may output media data in chunks of MBs. This creates two problems. First, the scheduler 100 may not be able to submit a large media data unit as a complete unit to the transport protocol for delivery. In this case, it will be necessary to divide the large media data unit into smaller units for delivery. Second, as the media stream data rate is estimated instantly upon the generation of the media data unit, a large media data unit may cause the estimated data rate to fluctuate significantly, e.g., the rate will increase sharply when a new media data unit is generated and transported to the scheduler 100.

To remedy these two problems, the scheduler 100 may divide a large incoming media data unit into multiple smaller media data units for delivery by the transport layer. In addition, the data generation time $g_i$ will be revised to represent the data generation time of the sub-divided media data units by interpolating from the data generation time of the incoming media data units. For example, assume each incoming large media data unit is divided into k smaller media data units for delivery, the revised media data unit generation time will be interpolated from $$g_i = (G_{\lfloor i/k \rfloor + 1} - G_{\lfloor i/k \rfloor})\left(\frac{i \bmod k}{k}\right) \quad (2.12)$$

where $G_i$ is the actual generation time of the incoming large media data unit i. Similar interpolation methods may also be devised for the case of variable-sized incoming media data unit, variable division factor k, and variable-sized outgoing media data unit.

1.4 Example 4

Extension to Variable Network Bandwidth

A further extension to the scheduler 100 is for the case where the amount of network bandwidth available is variable or not known a priori. In this case, $R_{max}$ is no longer a known constant and an additional method will be required to estimate it.

In this example, the scheduler 100 may further includes a $R_{max}(t)$ estimating unit 107 for estimating the maximal network bandwidth capacity $R_{max}(t)$. Then the transmission scheduling procedures for the units 101~104 may be revised to incorporate it by replacing $R_{max}$ in Equations (2.4) and (2.6) with $R_{max}(t)$. The rest of the procedures for the units 101~102 are the same and thus are not repeated here.

1.5 Example 5

Extension to Multi-Segment Media Streams

A further extension to the scheduler 100 is for the case where the media stream is composed of multiple segments which are individually requested by the client. For example, a media stream may be divided into segments of fixed size or fixed duration where the client will send a separate request (e.g., HTTP GET request) to individually request the delivery of the segments. The key difference here is that a media segment may not be transmitted until it is requested by the client, thus imposing an additional constraint to the scheduler.

One way to accommodate multi-segment media streams is to execute the scheduler only upon receiving a request from the client. In this case the scheduler determines and schedules all media data units contained in the requested media segment and then wait for the next client request. This method is suitable for the case where the media data rate and the network bandwidth capacity are both known a priori.

A more general method is to execute the scheduler independently from client requests but defer the scheduled transmission time for media data units until their associated segment request arrives from the client. The rest of the scheduling procedures is the same so the details are omitted here.

1.6 Example 6

Combinations of Extensions

The three extensions described in examples 2-5 may be further combined to match the properties of the target network/application by integrating the procedures from the desired extension(s). The integration procedures are straightforward and thus are not repeated here.

II. Client-Based Solutions

Client-based solutions are designed to be implemented inside the client device, e.g., as part of the client application software, operating system, firmware, or as a complementary software executing in parallel to the client application software.

Figure 8:
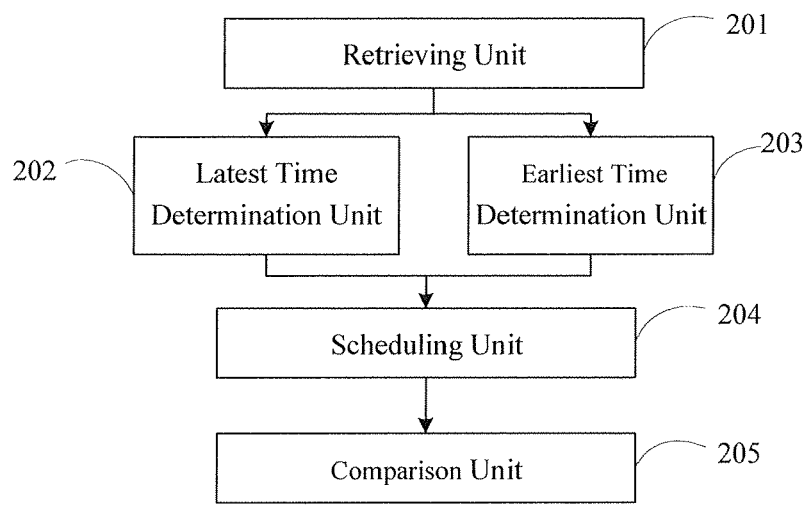
FIG. 8 is a block diagram illustrating a scheduler according to another embodiment of the application.

FIG. 8 is a block chart illustrating a reception scheduler 200 according to one embodiment of the application. The reception scheduler 200 operates with two input parameters: (a) the set of $\{p_i\}$, defined as the time, w.r.t. to the beginning of the media stream, when media data unit i will be decoded for playback; and (b) the maximum transmission rate $R_{max}$. Let $t_i$ and $s_i$, i=0, 1, . . . , be the time and the size (in bytes) of the $i^{th}$ media data unit received from the network transport. The objective of the reception scheduler is to determine the set $\{t_i\}$ such that (a) media data unit will arrive before their playback time; and (b) the short-term data rate does not exceed $R_{max}$.

The principle for the procedures of scheduler 200 is that a receiver/client may indirectly control the flow of media data from the sender by controlling the reception of data from the network transport. For example, if TCP is used as the transport then TCP's flow control will ensure that a sender/server will never transmit more data than the receiver's buffer availability. This is accomplished by having the receiver sending back the buffer availability as a field in the acknowledgement packet going back to the sender. Suppose the receiver reported that it has x bytes buffer space available. Then the sender will limit itself to sending no more than x bytes of data even if there are more data waiting to be transmitted.

Therefore if the receiver suspends itself from receiving data from the network transport, the transport's internal buffer will eventually fill-up, causing the sender to stop sending data as well. By taking advantage of this kind of flow control mechanism the receiver may then indirectly control the sender's data flow by controlling its own timings in receiving data from the network transport.

Specifically, as shown in FIG. 8, the scheduler 200 comprises a retrieving unit 201, an earliest time determining unit 202, a latest time determining unit 203 and a scheduling unit 204. The retrieving unit 201 operates to retrieve a time $p_i$ at which an $i^{th}$ media data unit is scheduled to be decoded for playback, and a maximum transmission rate $R_{max}$ for the media data units. The earliest time determining unit 202 operates to determine an earliest time $w_i$ for receiving the $i^{th}$ media data unit through the maximum transmission rate $R_{max}$ and a short-term data throughput over a past time interval for the media data units. The latest time determining unit 203 operates to determine a latest time $v_i$ for receiving an $i^{th}$ media data unit of the media data units from the determined time $p_i$. The scheduling unit 204 is used for optimizing the reception time for the $i^{th}$ media data unit within a range from $w_i$ to $v_i$.

In case that the short-term data rate is prevented from exceeding $R_{max}$, the earliest time determining unit 202 firstly determine the short-term data throughput for the received media data over the past $T_S$ seconds, denoted by $C(T_S,t)$, where $T_S$ is a configurable parameter to tune the averaging window duration and t is the current time:

$$C(T_S, t) = \frac{\sum_{\forall i \in \{t > t_i \geq max\{t_0, (t-T_S)\}\}} s_i}{\min\{T_S, t - t_0\}} \quad (3.1)$$

The earliest time determining unit 202 may then determine the earliest time $w_i$ to receive media data unit i from $$w_i = \min\{t | (C(T_S,t)\min\{T_S,t-t_0\}+s_i)/\min\{T_S,t-t_0\} \leq \rho R_{max}\} \quad (3.2)$$

where $\rho \in [R_{min}/R_{max}, 1]$ is a configurable parameter to tune the target short-term data throughput of the media stream.

And the latest time determining unit 203 operates to determine the latest time $v_i$ to receive media data unit i. As media data unit i is scheduled to be decoded for playback at playback time $p_i$, the scheduler must receive it no later than that, i.e., $$v_i \leq t_0 + p_i + \Delta \quad (3.3)$$

where $\Delta$ is the time from $t_0$ (reception of first media data unit) to the beginning of media playback—this is the prefetch buffer in many media players.

Now within the range from $w_i$ to $v_i$, The scheduling unit 204 may be used to further optimize the reception time based on other constraints or objectives. For example, the client will likely have a limited media data buffer size, say B bytes, to temporarily store the received media data before they are decoded for playback. In this case, the reception time may need to be scheduled to later than $w_i$ to prevent overflowing the media data buffer. Alternatively, the client may prefer to receive data at rate lower than the maximum rate $R_{max}$, to reduce the likelihood of packet loss, or to make available bandwidth to other data flows, or other reasons. In this case, the reception time will also need to be scheduled by the scheduling unit 204 to be later than $w_i$ accordingly.

In addition, the scheduler 200 further comprises a comparison unit 205, which is used to compare $v_i$ against the current time t. If $v_i \le t$, then the scheduled reception time had already passed and the comparison unit 205 will then immediately receive the media data unit from the network transport. Otherwise if $v_i > t$, then the comparison unit 205 will wait for a time equal to $(t-v_i)$ and then receive the media data unit from the network transport.

The client-based reception scheduling for the scheduler 200 as described in the above already supports VBR-encoded media streams. The set of $\{p_i\}$ fully describe the bit-rate profile of the media stream and thus its timing requirements are already incorporated into the reception scheduler.

Figure 9:
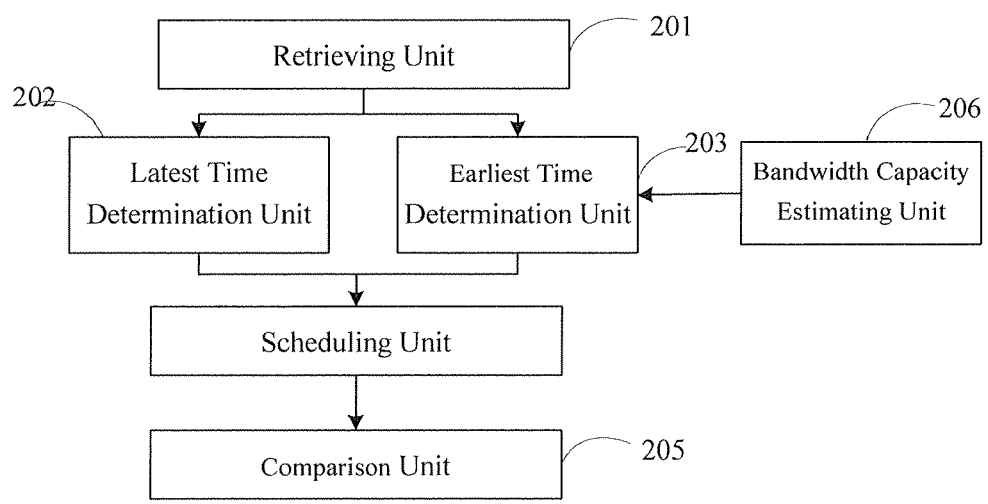
FIG. 9 is a block diagram illustrating a scheduler according to another embodiment of the application.

An extension to the scheduler 200 is for the case where the amount of network bandwidth available is variable or not known a priori. In this case, $R_{max}$ is no longer a known constant and an additional method will be required to estimate it. In this case, the scheduler 200 may further comprises a maximal rate estimating unit 206 to estimate the network bandwidth capacity, i.e. $R_{max}(t)$, as shown in FIG. 9. Then the reception scheduling procedures for the units 201~204 may be revised to incorporate it by replacing $R_{max}$ in equation (3.2) with $R_{max}(t)$. The rest of the procedures for units 201~205 are the same as described in the above and thus are not repeated here.

III. Network-Based Solutions

Figure 10:
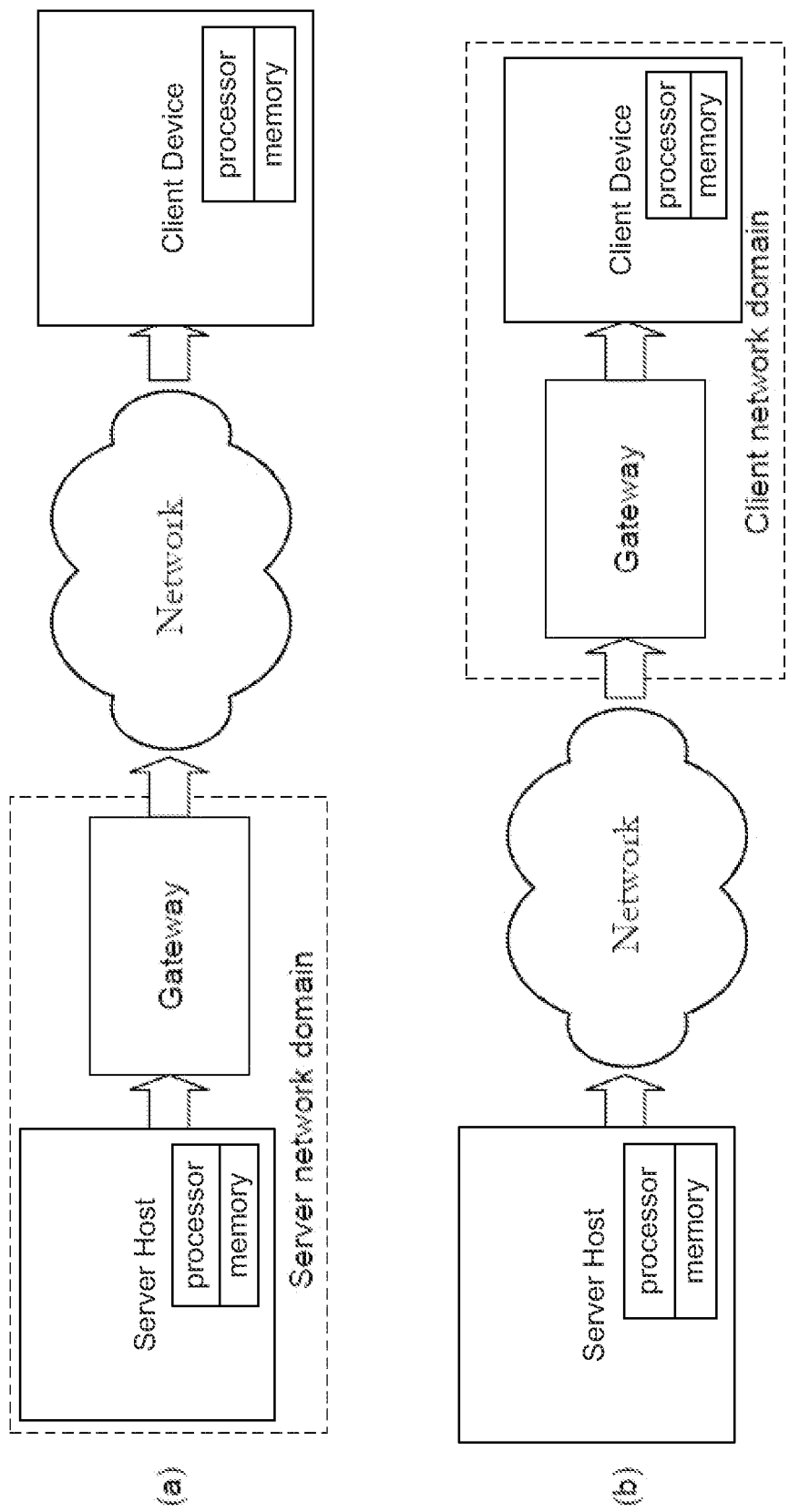
FIG. 10(a) illustrates a Network-based solution implemented at the server-side (a).
FIG. 10(b) illustrates a Network-based solution implemented at the client-side (b).

Network-based solutions are designed to be implemented as part of the network infrastructure so that neither the server nor the client needs to be modified. Two ways to implement a network-based solution are depicted in FIG. 10. A gateway is introduced between the server and the client where all data traffic between the server and the client will pass through it. This may be done either by means of physically inserting the gateway in-between network connections or by means of logically routing data traffic to the gateway.

If the network path between the server and the gateway is not the bottleneck, the gateway implements the transmission scheduler 100 to schedule the transmission of media data units received from the server to the client. In this context, $t_i$ will represent the time at which media data unit i is received from the server. The gateway will simply receive media data units from the server as fast as possible subject to its own buffer and other constraints.

Otherwise, if the network path between the server and the gateway is the bottleneck, the gateway implements the reception scheduler 200 to schedule the reception of media data units received from the server. In this context, $t_i$ will represent the time at which media data unit i is scheduled to be received from the network transport connected to the server. The gateway will simply send media data units to the client as fast as possible subject to its other constraints, if any.

The device for scheduling transmission time of media data according to the application has been discussed in the above. Hereinafter, the method scheduling transmission time of media data according to the application will be discussed.

Figure 11:
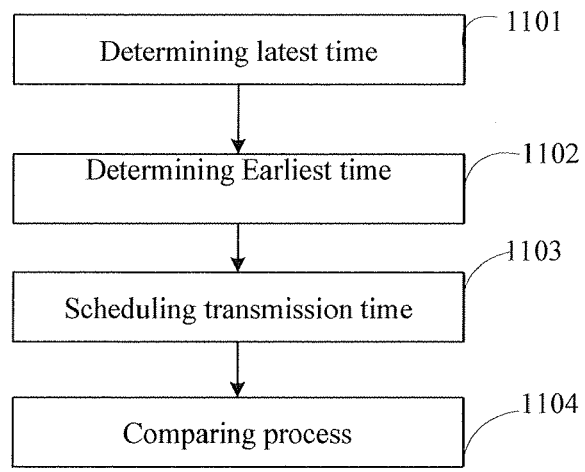
FIG. 11 is a flow chart illustrating scheduling transmission time of media data according to one embodiment of the application.

FIG. 11 is a flow chart illustrating the scheduling transmission time of media data according to one embodiment of the application, wherein the media data comprises a plurality of media data units. As is shown in FIG. 11, at step S1101, a latest time $v_i$ for transmitting an $i^{th}$ media data unit of the media data units is determined, for example, by a transmission scheduler 100 as described in the above. The latest time vi may be determined through an overall average data throughput C(t) and a minimum data rate $R_{min}$ for the pluralities of media data units such that an overall data throughput therefor is maintained to be above the minimum rate $R_{min}$. In particular, step S1101 may be carried out by rules as set forth in equations (2.1)-(2.2) or (2.8).

At step S1102, an earliest time $w_i$ for transmitting each of the media data units is determined. The earliest time $w_i$ may be determined through a short-term data throughput $C(T_S, t)$ for the media data units and the short-term rate maximum $R_{max}$ over a past transmission period. In particular, step S1102 may be carried out by rules as set forth in equations (2.3)-(2.4).

And at step S1103, a transmission time $u_i$ for the $i^{th}$ media data unit is scheduled based on the latest time $v_i$ or the earliest time $w_i$ by rule of:

if $v_i \ge w_i$, $u_i = \max\{w_i, t_i\}$, where $t_i$ represents a predetermined transmission time for the $i^{th}$ media data unit, and if $v_i < w_i$, scheduling the transmission time $u_i$ at the earliest time $w_i$ such that a short-term rate maximum $R_{max}$ of the media data units is not exceeded.

Finally, at step S1104, the scheduled transmission time $u_i$ is compared with a current time t. If the scheduled transmission time $u_i$ is not larger than the current time t, the $i^{th}$ media data unit is transmitted immediately; otherwise, it needs to wait for a time equal to $(t-u_i)$ and then transmitting the $i^{th}$ media data unit.

In one embodiment, the media data rate was assumed to be a constant so that the minimum rate limit $R_{min}$ may be configured to match the media data rate. In another embodiment, the transmission method as shown in FIG. 11 may be extended to support the streaming of VBR-encoded media streams if the bit-rate profile is known, which is identical to the contents related to equations (2.7)~(2.10).

In some applications such as live streaming, the precise media data rate may not be known a priori. The above method tackles this problem by estimating the media data rate from monitoring the data generation process. For example, the short-term minimum rate limit $R_{min}(t)$ may be estimated based on the rate or the time at which media data units are generated.

The method as described above may be carried out between a server application layer and a network transport layer in a server host, or carried out in a gateway associated with a server host.

Figure 12:
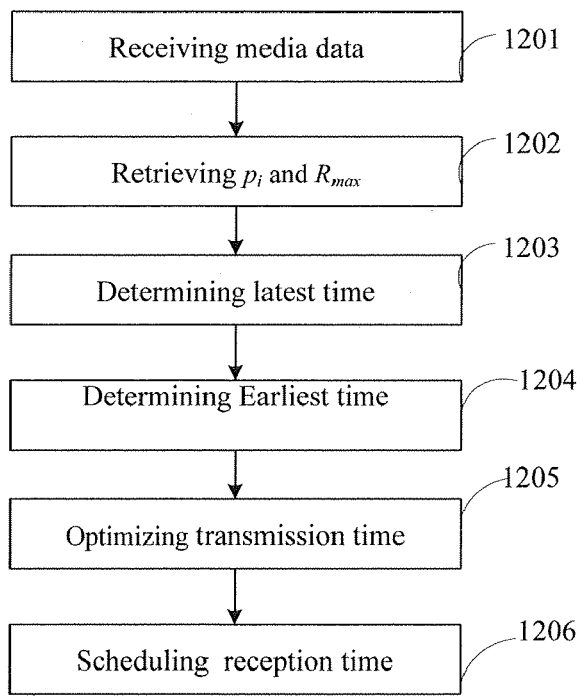
FIG. 12 is a flow chart illustrating scheduling transmission time of media data according to another embodiment of the application

FIG. 12 is a flow chart illustrating scheduling transmission time of media data according to another embodiment of the application. As is shown in FIG. 12, at step S1201, a plurality of media data units of the media data is received. And at step S1202, a time $p_i$ at which an $i^{th}$ media data unit is scheduled to be decoded for playback is retrieved, and a maximum transmission rate $R_{max}$ for the media data units is retrieved. If the set of $\{p_i\}$ is given a priori, then the set may be incorporated into the scheduling methods described shown in FIG. 11. Specifically, it needs to revise the minimum rate limit $R_{min}$ as long-term average data throughput will not be useful for VBR-encoded media stream. The minimum rate limit $R_{min}$ is replaced by the short-term variable minimum rate limit $R_{min}(t)$ which is a media-playback-time-dependent function computed from equation (2.7).

And then, at step S1203, an earliest time $w_i$ for receiving the $i^{th}$ media data unit is determined through the maximum transmission rate $R_{max}$ and a short-term data throughput over a past time interval for the media data units as described in reference to equations (3.1)-(3.2)

At step 1204, a latest time $v_i$ for receiving an $i^{th}$ media data unit of the media data units from the determined time $p_i$ is determined by rule as set forth in equation (3.3). Then, the reception time for the $i^{th}$ media data unit will be optimized within a range from $w_i$ to $v_i$ at step S1205. For example, the client will likely have a limited media data buffer size, say B bytes, to temporarily store the received media data before they are decoded for playback. In this case, the reception time may need to be scheduled to later than $w_i$ to prevent overflowing the media data buffer. Alternatively, the client may prefer to receive data at rate lower than the maximum rate $R_{max}$, to reduce the likelihood of packet loss, or to make available bandwidth to other data flows. In this case, the reception time will also need to be scheduled to later than $w_i$ accordingly At step S1206, the scheduled reception time $t_i$ is compared with a current time t. If the scheduled time $t_i$ is not larger than the current time t, the $i^{th}$ media data unit will be received immediately; otherwise, it needs to wait for a time equal to $(t-t_i)$ and then receive the $i^{th}$ media data unit.

An extension for the method as shown in FIG. 12 is for the case where the amount of network bandwidth available is variable or not known a priori. In this case, $R_{max}$ is no longer a known constant and an external method will be required to estimate it. Let $R_{max}(t)$ be the estimated network bandwidth capacity. Then the reception scheduling procedure may be revised to incorporate it by replacing $R_{max}$ in equation (3.2) with $R_{max}(t)$. The rest of the procedures are the same and thus are not repeated here.

The embodiments according to the application have been described in reference to the accompanying drawings, but the present invention is not limited thereto. Various modifications and changes may be made by those skilled in the art according to the disclosure herein, which should be within the scope of the present invention.

What is claimed is:

1. A device to schedule transmission time of media data units, the device operable to execute instructions stored in a non-transitory form, to:
   determine a latest time for transmitting each of the media data units;
   determine an earliest time for transmitting each of the media data units; and
   determine whether the determined latest time for one of the media data units is not less than the determined earliest time for said media data unit;
   schedule a transmission time for each of the media data units,
   wherein, if the determined latest time for one of the media data units is not less than the determined earliest time for said media data unit, the device executes instructions to select as the transmission time for said one of the media data units a larger one from the determined earliest time and a time at which the one of the media data units was originally submitted to the device for transmission; otherwise, the device executes instructions to schedule the transmission time at a determined earliest time relative to at least one previous earliest time.

2. A device according to claim 1, wherein the device is operable to execute the instructions to further determine the latest time based on an overall average data throughput and a minimum data rate for the media data units such that an overall data throughput for the media data units is maintained to be above the minimum rate.

3. A device according to claim 1, wherein the device is operable to execute the instructions to further determine the earliest time based on a short-term data throughput for the media data units and a short-term rate maximum for the media data units over a past transmission period.

4. A device according to claim 1, wherein the device is operable to execute the instructions to further compare a scheduled transmission time for each of the media data units with a current time,
   wherein the device transmits each of the media data units immediately if the scheduled transmission time is not larger than a current time; and
   if the scheduled transmission time is larger than the current time, the device waits for a time equal to a difference of the current time and the scheduled transmission time, and then transmits each of the media data units.

5. A device according to claim 1, wherein a rate for transmitting the media data units is constant.

6. A device according to claim 2, wherein the media data units are in the form of a VBR-encoded media stream, and
   wherein the minimum data rate has a short-term variable minimum data rate limit and is dependent on a media-playback-time.

7. A device according to claim 2, wherein the media data includes live streaming data, the minimum data rate has a short-term minimum rate limit, and the device is operable to execute the instructions to further estimate rates or times at which media data units are generated; and to estimate the short-term minimum rate limit based on a generated rate.

8. A device according to claim 1, wherein the instructions reside between a server application layer and a network transport layer in a server host.

9. A device according to claim 1, wherein the device is a gateway associated with the server host.

10. A device according to claim 2, wherein a latest time for a media data unit i of the media data units, denoted by $v_i$, is computed by a first rule of $$v_i = \max\left\{\max\left\{t \;\middle|\; \frac{(C(t)\min\{T_L, (t-u_0)\} + s_i)}{\min\{T_L, (t-u_0)\}} > R_{min}\right\}, t_i\right\}$$

wherein
   t is a current time;
   C(t) represents a long-term data throughput in a time interval $T_L$ for the media data unit;
   $u_0$ represents the transmission time for the first media data unit;
   $s_i$ represents a size of the $i^{th}$ media data unit;
   $t_i$ represents a time at which the $i^{th}$ media data unit was originally submitted to a device for transmission;
   $R_{min}$ represents an allowable minimum transmission rate.

11. A device according to claim 3, wherein the earliest time for a media data unit i of the media data units, denoted by $w_i$, is determined by a second rule of $$w_i = \max\left\{\min\left\{t \;\middle|\; \frac{(C(T_S, t)\min\{T_S, t-u_0\} + s_i)}{\min\{T_S, t-u_0\}} \leq \rho R_{max}\right\}, t_i\right\}$$

wherein
   t is a current time;
   $\rho \in [R_{min}/R_{max}, 1]$ is a configurable parameter;

C($T_S$, t) represents a short-term data throughput in a time interval $T_S$ for the media data unit;

$u_0$ represents a transmission time for a first media data unit;

$s_i$ represents a size of an $i^{th}$ media data unit;

$t_i$ represents a time at which the $i^{th}$ media data unit was originally submitted to the device for transmission;

$R_{max}$ represents an allowable maximum transmission rate; and $R_{min}$ represents an allowable minimum transmission rate.

12. A server-based method executed by a server host for scheduling a transmission time of media data units, the method comprising:

determining, by the server host, a latest time for transmitting each of the media data units;

determining, by the server host, an earliest time for transmitting each of the media data units; and comparing the determined latest time for one of the media data units with the determined earliest time for said media data unit;

scheduling, by the server host, a transmission time for each of the media data units, wherein the scheduling further comprises:

if based on the comparision the determined latest time for one of the media data units is not less than the determined earliest time for the media data units, selecting a larger one from the determined earliest time and a time at which the media data unit was originally submitted for transmission, as the transmission time for said media data unit;

otherwise, scheduling the transmission time at a determined earliest time relative to at least one previous earliest time.

13. A method according to claim 12, wherein the determining the latest time further comprises:

determining the latest time through an overall average data throughput and a minimum data rate for the plurality of media data units such that the overall data throughput for the media data units is maintained to be above the minimum data rate.

14. A method according to claim 12, wherein the determining the earliest time further comprises:

determining the earliest time through a short-term data throughput for the media data units and a short-term rate maximum for the media data units over a past transmission period.

15. A method according to claim 13, wherein the latest time for media data unit i, denoted by $v_i$, is determined by a first rule of $$v_i = \max\left\{\max\left\{t \;\middle|\; \frac{C(t)\min\{T_L, (t-u_0)\} + s_i}{\min\{T_L, (t-u_0)\}} > R_{min}\right\}, t_i\right\}$$

wherein t is a current time;

C(t) represents a long-term data throughput in a time interval $T_L$ for the media data unit;

$u_0$ represents the transmission time for the first media data unit;

$s_i$ represents a size of the $i^{th}$ media data unit;

$t_i$ represents a time at which the $i^{th}$ media data unit was originally submitted to a device for transmission;

$R_{min}$ represents an allowable minimum transmission rate.

16. A method according to claim 14, wherein the earliest time for media data unit i of the media data units, denoted by $w_i$, is determined by a second rule of $$w_i = \max\left\{\min\left\{t \;\middle|\; \frac{C(T_S, t)\min\{T_S, t-u_0\} + s_i}{\min\{T_S, t-u_0\}} \leq \rho R_{max}\right\}, t_i\right\}$$

wherein t is a current time;

$\rho \in [R_{min}/R^{max}, 1]$ is a configurable parameter;

C($T_S$, t) represents a short-term data throughput in a time interval $T_S$ for the media data unit;

$u_0$ represents a transmission time for the first media data unit;

$s_i$ represents a size of the $i^{th}$ media data unit;

$t_i$ represents a time at which the $i^{th}$ media data unit was originally submitted to a device for transmission;

$R_{max}$ represents an allowable maximum transmission rate; and $R_{min}$ represents an allowable minimum transmission rate.

17. A method according to claim 12, further comprising:

comparing the scheduled transmission time with a current time, transmitting each of the media data units immediately if the scheduled transmission time is not larger than the current time; and waiting for a time equal to a difference of the current time and the scheduled transmission time, and then transmitting each of the media data units if the scheduled transmission time is larger than the current time.

18. A method according to claim 12, wherein a rate for transmitting the media data units is constant.

19. A method according to claim 13, wherein the media data units are in the form of a VBR-encoded media stream, and the minimum data rate has a short-term variable minimum rate limit and is depend on a media-playback-time.

20. A method according to claim 12, wherein the media data units are in the form of live streaming data, a minimum data rate has a short-term minimum rate limit, and the method further comprises:

measuring rates or time at which media data units are generated; and estimating the short-term minimum rate limit based on the generated rate.

21. A method according to claim 12, wherein the method is carried out between a server application layer and a network transport layer in the server host.

22. A method according to claim 12, wherein the method is carried out in a gateway associated with the server host.

* * * * *